Patented Mar. 12, 1929.

1,704,694

UNITED STATES PATENT OFFICE.

AUGUST ALBERT, OF MUNICH, AND JOHANNES PFLEGER, OF FRANKFORT-ON-THE-MAIN, GERMANY, ASSIGNORS, BY MESNE ASSIGNMENTS, TO WINTHROP CHEMICAL COMPANY, OF NEW YORK, N. Y., A CORPORATION OF NEW YORK.

MERCURY COMPOUNDS HAVING THERAPEUTIC PROPERTIES.

No Drawing. Application filed November 24, 1923, Serial No. 676,845, and in Germany December 5, 1922.

This application is a continuation in part of applicants' copending application S. N. 671,076, filed Oct. 27, 1923.

After it was recognized that several organic mercury compounds show valuable therapeutical properties, the most variated types of classes of organic bodies were mercurated and their behaviour towards the animal organisms tested, the aim in view being to find new and useful weapons for fighting diseases.

The results of these investigations were very poor indeed. Only a very small number of organic compounds could be introduced as medicines into practical use.

We have now succeeded in finding a new class of organic mercury compounds, several representatives of which show an extremely strong therapeutical effect. The chief characteristic of the new compopunds is the presence in the molecule of the very active group $C=O$ or $C=N$, the latter of which may be derived from the former.

The following are some compounds representing the various classes of the above mentioned types: hydro-oxyacetophenone, aminoacetophenone, halogen-acetophenone, acetophenoncarboxylic acid, acetophenonsulphonic acid, acetophenonarsonic acid, acetophenone-carbotylic acid-semicarbazone, acetophenon-arsonic acid-semicarbazon etc. The composition of the compounds in question may be expressed by the following formulæ:

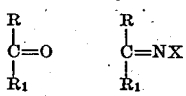

in which R means an aromatic, $R_1$ an aliphatic radical.

The mercurating of these compounds is carried out in various ways such as by heating the compound to be mercurated with a mercury compound for instance acetate of mercury. Or the components of the reaction are allowed to react on each other in an indifferent medium of solution or suspension; or mercuric oxide is made to react with the substance to be mercurated in a medium of alkaline or neutral or weakly acid reaction.

According to the temperature chosen for working the mercury enters into the nucleus of the aromatic radical R or into the aliphatic side chain $R_1$.

The production of the mercury compounds derived from and corresponding to the following formulæ

and

may be carried out in acordance with the above mentioned modifications.

(1) Either a substance of the formula.

is mercurated directly or (2) A substance of the formula

is mercurated and then brought into reaction in the well known manner with a body $H_2NX$, whereby generally, the following reaction takes place:

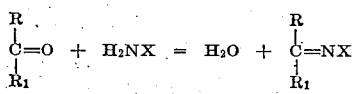

To show the way in which the invention may be carried out, we give the following examples:

(1) 20 g. p-acetophenone carboxylic acid are mixed with 30 g. acetate of mercury. The mixture is kept in a preheated oil bath at about 130–140° C. until the precipitation of the mercury oxide by caustic soda solution ceases. This takes as a rule from 15 to 25 minutes. The new compound is soluble in sodium carbonate and caustic alkali.

With the quantities as indicated above the acid is kept in excess. Thereby the formation of a di-mercury compound is avoided.

(2) If the molecule of the acid is treated with 2 mol. of mercury acetate, but otherwise treated in the same way as described in Example (1) a dimercury compound is formed, the constitution of which is probably

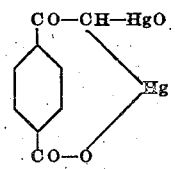

(3) 0,5 g. p-acetophenone arsonic acid are well mixed with 0,5 g. mercury acetate, wherefor a strong smell of acetic acid is observed, probably by forming the mercury salt. The mixture is heated for one hour at about 130° C. The slightly brown solid mass is boiled with water and the nearly colourless product drawn off. It may be recrystallized out of caustic solution. It has a melting point higher than 270° C.

(4) 0,8 g. p-chloric acetophenone mixed with 1,6 g. mercury acetate are heated for a short time at about 130° C. The melt is suspended in a small quantity of diluted alcohol and the colourless residue drawn off and dried. The melting point is higher than 270° C. The structural formula of the product formed in accordance with this example is as follows:—

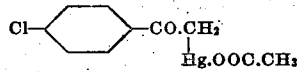

(5) 0,7 g. p-hydroxy-acetophenone and 1,6 g. mercury acetate are well mixed and heated a short time at a temperature of more than 100° C. There results a brown resinous melt which is dissolved in acetic acid and which after addition of caustic solution gives a colourless precipitation. It dissolves easily in caustic solution in consequence of its content of hydroxyl. It decomposes at about 175° C. The structural formula of the product formed in accordance with this example is as follows:—

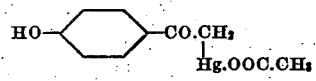

6) If 0,4 g. p-aminoacetophenone and 1 g. mercury acetate are heated at temperatures of more than 100° C., a dark brown melt results. After cooling it may be treated in the following manner: The melt is dissolved in acetic acid, the solution filtered through animal charcoal and precipitates the yellow base with caustic solution. It decomposes at about 215° C.

(7) 0,2 g. acetophenone salycilic acid are well mixed with 0,3 g. mercury acetate and heated for a short time at a temperature beginning with 45° C. The melt is stirred with water, drawn off, separated and recrystallized with caustic solution. The product is precipitated as a colourless powder out of the alkaline solution by making it acid. The structural formula of the product formed in accordance with this example is as follows:

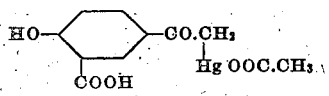

(8) 2,5 g. p-acetophenonearsonic acid are dissolved in 5 mol. n-sodium hydroxide. To the solution are added 2.2 g. of precipitated mercuric oxide. At ordinary temperature the reaction takes place and the whole of the mercuric oxide goes into solution. The clear solution after being filtered is slightly acidified and the crystalline precipitate of the arsonic acid is separated by suction. The structural formula of the product formed in accordance with this example is as follows:

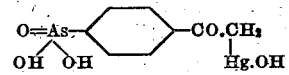

(9) 3 g. p-acetophenonearsonic acid semicarbazone are dissolved in n-sodium hydroxide solution. To the solution are added 2 g. of precipitated mercuric oxide. The reaction takes place even at ordinary temperature, the mercuric oxide going into solution; the solution is drawn off, the clear filtrate is neutralized and the formed mercury compound drawn off and dried. The acid may be converted into readily soluble salt by neutralizing it with alkali. This can be separated from the aqueous solution in solid form for instance by precipitation with alcohol. The following equation contains the structural formulæ showing the course of the above reaction.

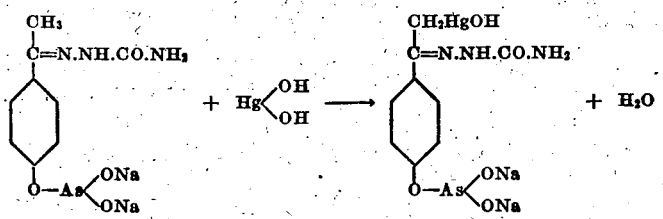

What we claim is:

1. A new mercury compound having therapeutic properties comprising a compound of the general formula $$\begin{array}{c} R \\ | \\ C=N-X, \text{ mercurated,} \\ | \\ R_1 \end{array}$$

in which X represents either a hydrogen atom, an aliphatic or aromatic radical, R an aromatic radical, $R_1$-hydrogen or an aliphatic radical, and in which the nitrogen is connected with the carbon atom in a non-cyclic combination.

2. A new mercury compound having therapeutic properties comprising a compound of the general formula $$\begin{array}{c} R \\ | \\ C=N-X, \text{ mercurated,} \\ | \\ R_1 \end{array}$$

wherein X represents the radical NH—CO—$NH_2$, R an aromatic and $R_1$-hydrogen or an aliphatic radical, and wherein the nitrogen is connected with the carbon atom in a non-cyclic combination.

3. A new mercury compound having therapeutic properties comprising a compound of the general formula $$\begin{array}{c} R \\ | \\ C=N-NH-CO-NH_2, \text{ mercurated,} \\ | \\ CH_3 \end{array}$$

wherein R represents an aromatic radical.

4. A new mercury compound having therapeutic properties comprising a compound of the formula $$\begin{array}{c} (OH)_2OAs-C_6H_4 \\ | \\ C=N-NH-CO-NH_2, \text{ mercurated.} \\ | \\ CH_3 \end{array}$$

In testimony whereof we have signed our names to this specification.

AUGUST ALBERT.
JOH. PFLEGER.